Sept. 20, 1971  H. ERDMANN  3,605,556
BOOSTER PUMP

Filed Oct. 14, 1969  2 Sheets-Sheet 1

Inventor
Hans Erdmann

By (signature)
Agent

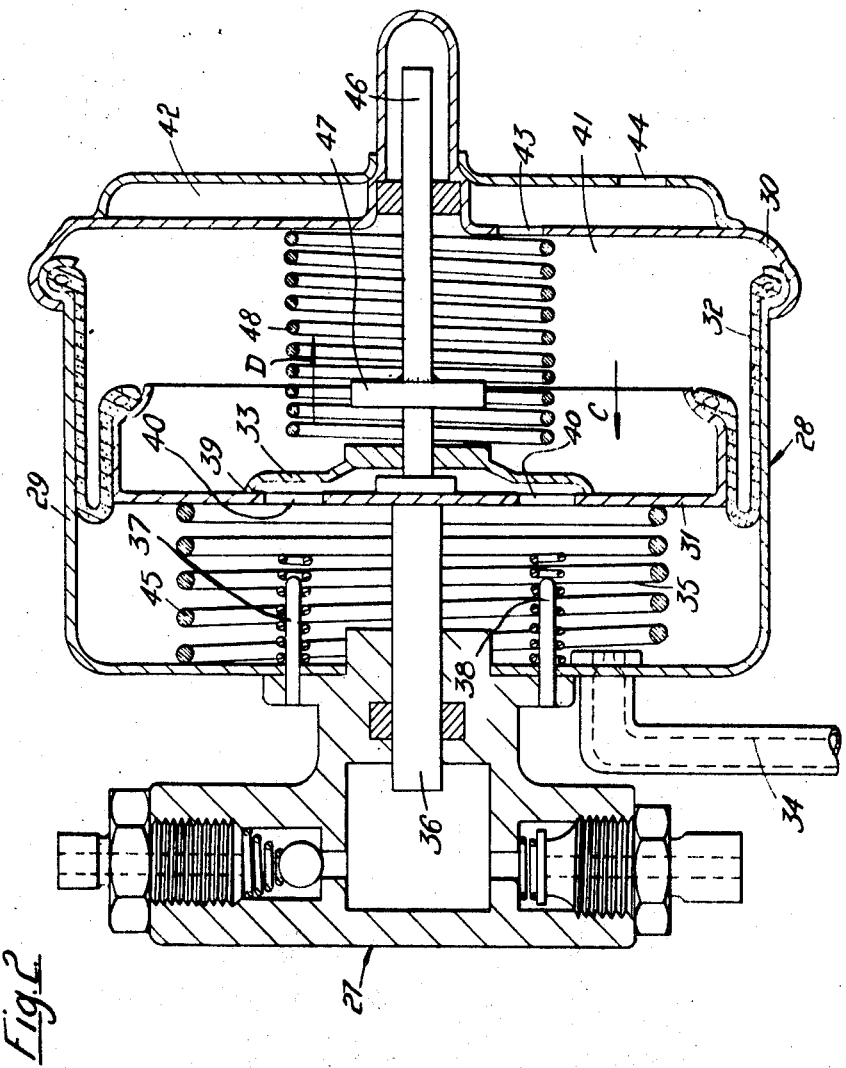

United States Patent Office 3,605,556
Patented Sept. 20, 1971

3,605,556
BOOSTER PUMP
Hans Erdmann, Schonbornring, Germany, assignor to
International Telephone and Telegraph Corporation,
New York, N.Y.
Filed Oct. 14, 1969, Ser. No. 866,297
Claims priority, application Germany, Oct. 22, 1968,
P 18 04 411.6
Int. Cl. F01l *15/02, 21/04*
U.S. Cl. 91—50                                                3 Claims

ABSTRACT OF THE DISCLOSURE

A reciprocating plunger pump for use as a booster in power assisted brakes in which a pump actuator directly coupled to the pump is driven by the difference between atmospheric pressure and engine vacuum acting across a piston which is sealed by a rolling membrane. The actuator may have a reversing valve in the piston which automatically switches the pressure on one side of the piston between the atmospheric and engine vacuum pressure at the end of each stroke while maintaining the other side at atmospheric pressure to cause the piston to oscillate. A spring acts against the atmospheric pressure on the piston.

BACKGROUND OF THE INVENTION

The invention relates to a booster pump for a hydraulic system, and particularly for a hydraulic brake system for vehicles.

In brake actuating systems for heavy vehicles it is usually necessary to provide a special booster to multiply the pedal force. One type of system presently in use comprises a pump driven by the vehicle engine, an accumulator and a master cylinder with a valve to control the pressurized medium and a servo piston. Such brake actuating systems are, however, extremely intricate and costly and therefore they are not suitable for medium-priced passenger cars.

It has also been proposed to utilize the underpressure in the suction line of the vehicle engine to enable the pump to convey pressure medium into the pressure accumulator. However, the conventional pump drives of this type need a plurality of valves which increase the price and the likelihood of malfunction.

SUMMARY OF THE INVENTION

An object of the present invention is to provide a simple, inexpensive booster pump and accumulator for passenger car brake systems which is not likely to malfunction.

This object and others which will be apparent hereinafter are attained in accordance with the present invention by a reciprocating plunger pump directly coupled to an actuator piston which is driven by the difference between atmospheric pressure and engine vacuum acting across the piston which is sealed by a rolling diaphragm.

In one preferred embodiment the working chamber on one side of the piston communicates with the suction line of the engine and the chamber on the other side of the piston communicates with atmosphere through holes in the housing. A spring acts on the side of the piston exposed to engine vacuum to balance the atmospheric pressure. Such a construction avoids the necessity of a reversing device and replaces it by the pressure variations in the suction line of the engine which occur during normal driving. Naturally the displacement of the piston and the pump have to be sufficiently large to deliver enough brake fluid in one stroke to provide for one actuation of the brakes.

In another preferred embodiment of the invention a reversing valve automatically switches the pressure in the chamber on one side of the piston between atmospheric and engine vacuum pressure at the end of each stroke while maintaining the chamber on the other side of the piston at atmospheric pressure to cause the piston to oscillate. In this embodiment the operating piston separating the two working chambers is provided with holes which are closed by a valve on the piston during the working stroke in such a manner that the connection between the vacuum chamber and the chamber with higher pressure is restored by lifting the valve from its sealing seat by means of fixed reversing pins which contact the valve at the end of the stroke. A magnet attached to a rod passing through the piston attracts the valve after the valve is opened and holds the valve in the open position until the operating piston has executed another stroke. At the end of this stroke a spring overcomes the magnetic force and closes the valve thereby reestablishing the pressure differential across the piston to start another cycle.

Although the magnet fixed on the push rod is shown as a permanent magnet, it could just as well be an electromagnet.

According to the invention the working cylinder forming the two working chambers is bipartite, the two parts being connected by a rolling membrane which seals the operating piston. Advantageously the operating piston is directly connected to the plunger of the pump so that they reciprocate along the same axis.

BRIEF DESCRIPTION OF THE DRAWINGS

FIG. 2 is a longitudinal view through another embodiment of the invention in which the operation of the actuator is reversed at the end of each stroke.

DESCRIPTION OF THE PREFERRED EMBODIMENTS

Figure 1:
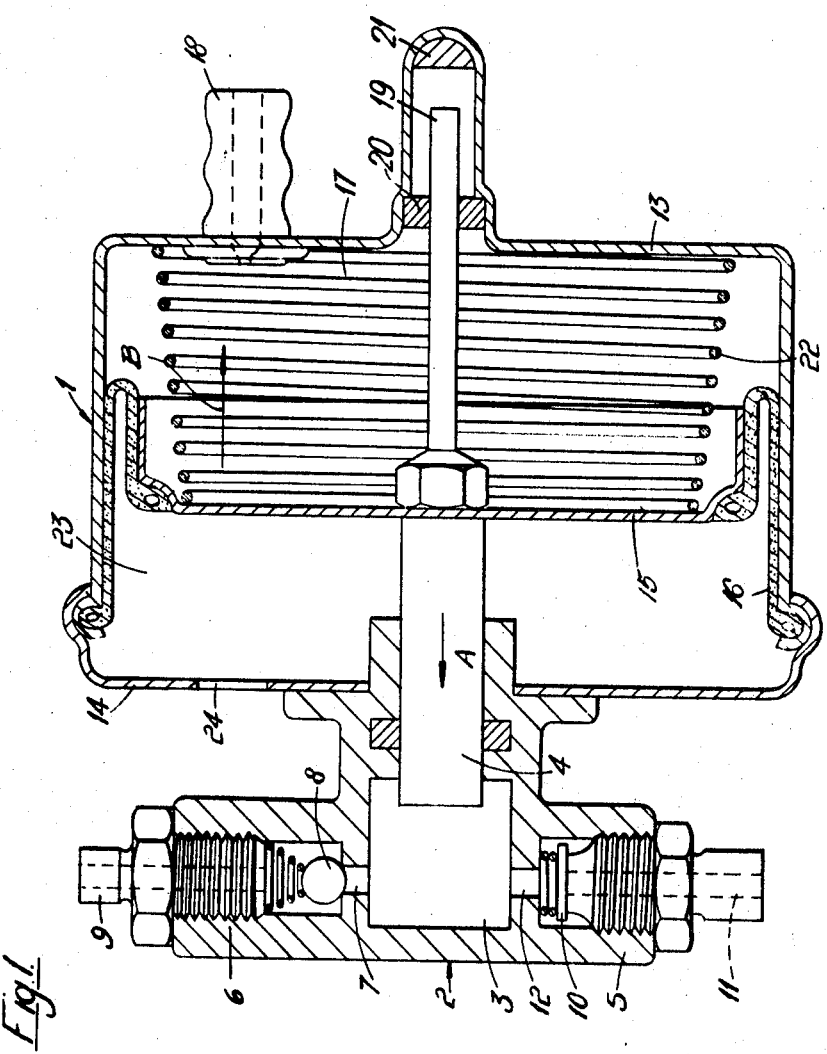
FIG. 1 is a longitudinal view through a pump and actuator embodying this invention.

Referring to FIG. 1 there is shown a device which comprises a drive 1 and a pump 2. The pump 2 has a chamber 3 into which the plunger 4 is pushed at each stroke, and a socket 5 for the inlet of the pressure medium and a socket 6 for the outlet of the pressure medium.

During pumping action the plunger 4, under the effect of the drive 1 described below, moves in direction of the arrow A into the chamber 3. In this way the pressure medium in the chamber 3 is forced through the outlet 7 and the check valve 8 into the pressure line connected at 9 to the accumulator of the brake actuating system which is not illustrated in the drawing. When the plunger 4 is moved in the direction opposite to arrow A, the check valve 8 closes the pressure medium passage at 7 and the check valve 10 opens the channel 11 which is connected with the pressure medium supply tank not illustrated in the drawing. Now, the pressure medium may flow into the chamber 3 through the passage 12.

The drive 1 for the plunger 4 consists of the two casing parts 13 and 14 tightly connected with one another, the working piston 15 and a rolling membrane 16 arranged between the operating piston 15 and the casing part 13. The vacuum chamber 17 formed by the operating piston 15 and the casing part 13 is connected through a nozzle 18 with the suction line of the engine not represented in the drawing.

When the engine is operating and the vacuum pressure in the suction line of the engine reaches a certain value, the operating piston 15 is forced against the spring 22 in direction of arrow B till the push rod 19 which is guided in the casing part 13 at 20 comes to lie on the stop 21. When the speed of rotations of the engine is reduced and the vacuum decreases, such as when the car stops at a traffic light, the absolute pressure in the chamber 17 increases and the operating piston 15 is moved leftward, opposite the direction of arrow B, by the spring 22 and the decreased pressure difference. The air in the chamber 23 may escape through the hole 24.

The above described device provides one stroke of the plunger 4 for each variation of the rotational speed of the engine sufficient to operate the drive actuator. When the plunger 4 is properly designed the capacity of the pump 2 is sufficient to keep the accumulator of the servo brake actuating system filled.

The construction shown in FIG. 2 comprises the pump 27 which is identical to the pump illustrated in FIG. 1, and a drive 28. The drive 28 consists of the casing parts 29 and 30, the operating piston 31, the rolling membrane 32 and the valve disk 33. The working chamber 35 of the actuating device 28 is connected through a passage 34 with the suction of the engine not represented in the drawing. When the vacuum in the suction line of the engine and the passage 34 is reduced, the operating piston 31 moves in the direction of arrow C, since the chamber 35 is at engine vacuum pressure. When the operating piston 31 has moved left in the direction of arrow C so far that the plunger 36 has nearly completed a stroke, the reversing pins 37 and 38 which are mounted to the casing part 29 push against the valve disk 33 and lift it from the annular sealing seat 39 on the operating piston 31. Now the holes 40 connect the vacuum chamber 35 with the chamber 41 of the actuating device 28. Since the chamber 41 communicates with the outside air through the filter 42 and the holes 43 and 44, the pressure in the vacuum chamber 35 switches to atmospheric pressure and the operating piston 31 is moved by means of the spring 45 in direction of arrow D. In order to prevent the closing of the valve 33 as the piston moves to the right, away from the reversing pins 37, a permanent magnet 47 on the rod 46 keeps the valve disk 33 in an opened position till the valve disk 33 butts against the spring 48. The spring 48 lifts the valve disk 33 from the permanent magnet 47 when the operating piston 31 is moved further in direction of arrow D so that the air passage 39 and 40 is closed again. Now, the operating piston 31 and the plunger 36 move again in direction of arrow C; that is, leftwardly, because the vacuum is again established in chamber 35. When the operating piston 31 has moved far enough to the left side, the above-mentioned process is repeated automatically.

It will be appreciated that the invention illustrated and described herein may be modified by those skilled in the art without deviating from the spirit and scope of the invention as set forth in the following claims.

I claim as my invention:

1. A booster pump assembly having a hydraulic brake system for vehicles having a vacuum source comprising a reciprocating pump plunger, a piston adapted to reciprocate the plunger, working chambers on either side of the piston, means for connecting one of the working chambers to the vacuum source, means for connecting the other working chamber to atmosphere, a spring acting on the piston in opposition to the atmospheric pressure, the piston having moving in a closed cylinder which is divided into the two chambers by rolling membrane connected to the piston and cylinder wall, a valve in the piston having a part which is movable in an axial direction with respect to the piston to open the valve and thereby interconnect the chambers, a fixed abutment in the vacuum chamber adapted to contact the movable part and open the valve when the piston approaches the end of its stroke toward the vacuum chamber, releasable holding means for holding the valve open as the piston moves away from the abutment, and means for releasing the holding means when the valve approaches the end of its stroke away from the vacuum chamber.

2. The booster pump assembly of claim 1 wherein the releasable holding means is a magnet which is held at a fixed distance from the piston, the movable part of the valve is metallic and attracted to the magnet and the means for releasing the holding means is a second abutment which is in the atmospheric chamber and which is adapted to contact the movable part and force it away from the magnet when the piston approaches the end of its stroke away from the vacuum chamber.

3. The booster pump assembly of claim 2 wherein the second abutment is a spring and the magnet is a permanent magnet.

References Cited

UNITED STATES PATENTS

| | | | |
|---|---|---|---|
| 3,361,036 | 1/1968 | Harvey et al. | 91—22X |
| 3,397,619 | 8/1968 | Sturtevant | 91—337 |
| 3,427,929 | 2/1969 | Dawson | 91—347 |

PAUL E. MASLOUSKY, Primary Examiner

U.S. Cl. X.R.

91—224, 229, 337